(12) United States Patent
Gardner

(10) Patent No.: US 7,552,140 B2
(45) Date of Patent: Jun. 23, 2009

(54) SMART OWNER'S MANUAL

(75) Inventor: Judith Lee Gardner, Detroit, MI (US)

(73) Assignee: Temic Automotive of North America, Inc., Deer Park, IL (US)

( * ) Notice: Subject to any disclaimer, the term of this patent is extended or adjusted under 35 U.S.C. 154(b) by 0 days.

(21) Appl. No.: 10/205,173

(22) Filed: Jul. 25, 2002

(65) Prior Publication Data

US 2004/0019591 A1 Jan. 29, 2004

(51) Int. Cl.
*G06F 17/00* (2006.01)
*G06F 7/00* (2006.01)

(52) U.S. Cl. .................................. 707/104.1; 701/29

(58) Field of Classification Search ............. 707/104.1, 707/6, 201, 203, 200, 1, 10, 3, 5; 700/1, 700/90; 701/1, 23, 29, 24, 32
See application file for complete search history.

(56) References Cited

U.S. PATENT DOCUMENTS

| | | | | |
|---|---|---|---|---|
| 5,325,291 | A * | 6/1994 | Garrett et al. | 705/4 |
| 5,414,626 | A * | 5/1995 | Boorse et al. | 701/32 |
| 5,794,164 | A | 8/1998 | Beckert et al. | |
| 6,084,870 | A * | 7/2000 | Wooten et al. | 370/349 |
| 6,128,559 | A * | 10/2000 | Saitou et al. | 701/23 |
| 6,154,152 | A * | 11/2000 | Ito | 340/988 |
| 6,313,758 | B1 * | 11/2001 | Kobayashi | 340/932 |
| 6,421,046 | B1 | 7/2002 | Edgren | |
| 6,539,296 | B2 * | 3/2003 | Diaz et al. | 701/33 |
| 6,711,593 | B1 * | 3/2004 | Gordon et al. | 707/204 |
| 2001/0049569 | A1 * | 12/2001 | Gehrke | 701/1 |
| 2002/0015056 | A1 | 2/2002 | Weinlaender | |
| 2002/0082751 | A1 | 6/2002 | Obradovich et al. | |
| 2002/0087350 | A1 | 7/2002 | Miida et al. | |
| 2003/0114965 | A1 * | 6/2003 | Fiechter et al. | 701/29 |
| 2006/0025907 | A9 * | 2/2006 | Kapolka et al. | 701/29 |

FOREIGN PATENT DOCUMENTS

| | | |
|---|---|---|
| EP | 0893308 | 1/1999 |
| EP | 1050831 | 11/2004 |
| ES | 2165804 | 3/2002 |
| WO | WO 01/75729 | 10/2001 |

OTHER PUBLICATIONS

Swihart et al., Integrated Collision Warning and Vehicle Information System for Heavy Vehicles, Monitoring of Driver and Vehicle Performance (Digest No. 1997/122), IEEE Colloquium on Apr. 10, 1997, pp. 2/1-2/7.*

European Search Report for Application No. 03015713.5, dated Jan. 17, 2005.

* cited by examiner

*Primary Examiner*—Greta L Robinson

(57) ABSTRACT

A system that compares two sets of information to generate and store comparison results is disclosed. The sets of information may be information pertaining to known aspects of a product and aspects of a new product. The comparison of the sets of information yields information that highlights the differences between the known product and the new product. By distilling the differences between the known product and the new product, a smart owner's manual that is stripped of redundant information is created.

18 Claims, 4 Drawing Sheets

SMART OWNER'S MANUAL

TECHNICAL FIELD

This disclosure relates generally to information systems and, more specifically, a smart owner's manual for providing information to a user.

BACKGROUND

The advent of microprocessor and microcontroller technology has allowed many products to include functionality and features that would not otherwise be possible. The compact and inexpensive nature of controller and controller technology and the ease with which the functionality of these devices may be changed or augmented has lead to a consumer marketplace inundated with products having subtle functional differences from one another. For example, two different models of cellular telephones, television remote controls, video tape recorders, ovens, or any other consumer products may operate, from a user perspective, in subtly different ways. In fact, many manufacturers differentiate their own products along subtle functional lines and distribute products having different model numbers that function in subtly different ways into different marketing channels. While the products are essentially the same, subtle operational aspects of the products are different.

One particularly noticeable area in which subtle functional differences has arisen is in the automotive industry. While the basic functionality of vehicles (i.e., transportation) has remained constant, the environment in which drivers operate vehicles has drastically changed. For example, fifteen years ago nearly all vehicles included radios having identical user interfaces including analog tuning and mechanical pushbuttons to set station presets. Today, however, vehicle sound systems may include compact disk (CD) players, CD changer controls, cassette tape players, digital tuners, various numbers of station presets for amplitude modulation (AM) and frequency modulation (FM) bands and clocks. Across vehicle manufacturers, sound systems operate is subtle, different ways.

These subtle differences are not limited only to car audio systems. In fact, the location and functionality of windshield wiper controls, electronic mirror adjustments, headlights, interior lights, trunk latches and fuel latches, and the operation of temperature controls, to name a few, have changed and continue to change. Additionally, new functions and features appear on vehicles with regularity.

Not only are functional differences present between different vehicle models and between different vehicle manufacturers, functional differences are also present temporally between identical models of identical vehicles. For example, a year 2002 Cadillac Eldorado may include subtle functional differences from a year 2001 Cadillac Eldorado.

As will be readily appreciated, subtle functional differences in consumer products such as electronics or vehicles may prove frustrating to consumers. For example, a consumer may be irritated at the fact that she knows how to drive her new vehicle, but must struggle to find the controls for the windshield wipers for the first time when it begins raining, because the controls on the new vehicle are located in a different place than they were located on a vehicle with which she was previously familiar. In some cases pertaining to, for example, safety features such as lights, windshield wipers, traction control system interfaces and the like, the consumer may not only become frustrated, but may actually be in danger while trying to figure out how the new vehicle is different from a vehicle with which they are already familiar.

In an effort to inform consumers of their new vehicle operation, vehicle dealers typically walk a purchaser through the vehicle operation when the vehicle is purchased. The shortcomings of the new vehicle walk through are two-fold. First, typically not everyone who will drive the vehicle is present through the walk through and walk through information is not usually passed on to those absent from the walk through. Second, walk through information is quickly forgotten in the excitement of a new vehicle purchase.

Additionally, every vehicle manufacturer includes a lengthy owner's manual with each vehicle sold. While these owner's manuals include protracted discussions and instructions on even the subtlest details of the vehicle, the instructions are quite lengthy and are rarely read by consumers because consumers feel that they "already know how to drive." For example, although an owner's manual would clearly indicate where windshield wiper controls are located in the vehicle, the driver does not typically read the manual and, therefore, has to figure out where the wiper control is while driving on a dark and stormy night. At least one of the reasons that owner's manuals are not effective in communicating subtle operational differences is that it is difficult to distill an entire owner's manual into a short list of functional differences of which the consumer should be made aware. Another reason that manuals are not completely effective is that no person will ask to review an owner's manual for another person's car when driving that person's car for the first time. Further, certain drivers may be unable to read the English language in which the owner's manual may be written.

Skilled artisans will appreciate that elements in the figures are illustrated for simplicity and clarity and have not necessarily been drawn to scale. For example, the dimensions of some of the elements in the figures may be exaggerated relative to other elements to help to improve understanding the disclosure. Additionally, those having ordinary skill in the art will readily appreciate that the order of the blocks in the flow diagrams is merely exemplary and changes in the flow diagrams disclosed herein may be effected.

DETAILED DESCRIPTION

An information system is disclosed in detail below in conjunction with FIGS. 1-5. Briefly, the information system, which may be implemented in a vehicle or any other suitable product, may act as a smart owner's manual that is adapted to inform a user of the differences between features of the product in question and features of another product with which the user is already familiar. Alternatively, the features between products may be identical in their main characteristics, but one or the other of the features may have additional functionality that could be explained to the user. By sifting out information representative of features with which the user is already familiar, distilling a volume of information down to functional differences and feature differences between products, the consumer may more easily use enhanced or different functionality that is provided by the new product. The information provided to the user may be audio, textual or any other suitable information and may be presented at the user's request or upon actuation of a feature that operates differently from the user's prior understanding.

While the following description carries forward a description of an information system used in a vehicle, it should be noted that such a description is merely exemplary and is presented to facilitate understanding of the concepts disclosed herein. Accordingly, nothing disclosed herein should be construed as limiting the disclosed concepts to vehicular applications.

Figure 1:
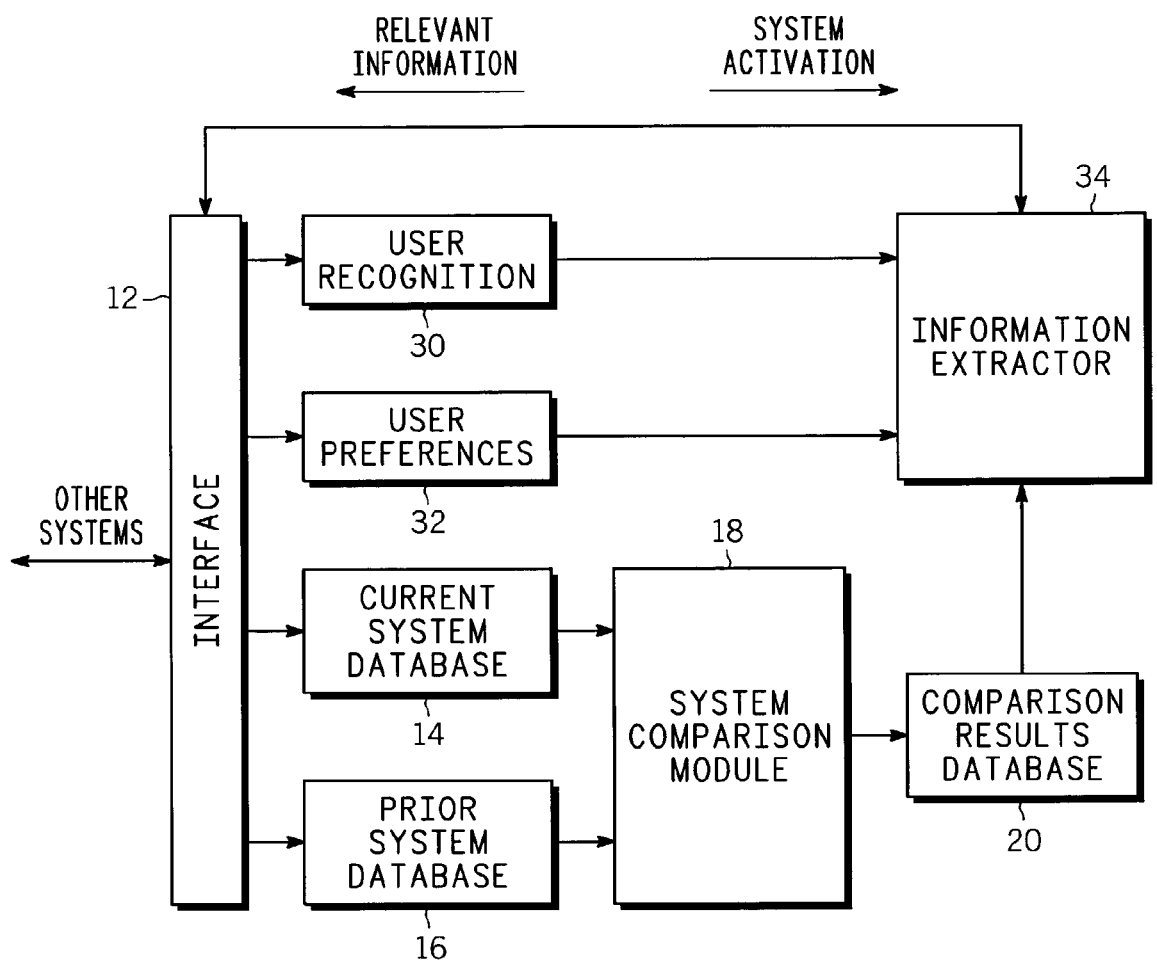
FIG. 1 is an exemplary block diagram of an information system.

Turning now to FIG. 1, an information system, such as, for example, a vehicle information system 10 may include a number of components. These components are embodied in hardware (e.g., application-specific integrated circuits, or the like) or in any suitable combination of hardware and software. The system 10 includes an interface 12 that links the various components of the system to other systems that may be present within a vehicle. Other systems may include, but are not limited to, vehicle controls (e.g., steering, braking, transmission controls and the like), accessory controls (e.g., power windows, power locks, sunroof/moonroof, temperature controls and the like), lighting controls (e.g., interior lights, headlights, door lights and the like) or any other suitable system. Additionally, the interface 12 may provide a connection to a wireless communication system, an Internet connection, a voice controlled input system or a computer system.

The system 10 further includes a current system database 14, e.g. a first Database, that, as described below, stores information associated with features of a first vehicle in which the system 10 is disposed. A prior system database 16, e.g. a second database, stores information associated with features of a second vehicle with which the user is previously familiar. Information associated with features may include, for example, vehicle make, model and features. In practice, information pertaining to features of the current and prior vehicles is written into the databases 14, 16 by for example, a wireless connection, an Internet connection, a magnetic or optical disk read by a suitable drive or any other suitable technique. This information could be provided by a website, a vehicle dealer, the user herself or a third party.

The information and features stored in the databases 14, 16 may include, but are not limited to, operational features, component locations and operations and luxury item features. Operational features may include, for example, progressive steering, anti-lock brakes, traction control, transmission control, cruise control, Advanced Driver Assistance Systems (ADAS), Advanced Traveler's Information Systems (ATIS) and the like. Advanced Driver Assistance Systems may include, but are not limited to, lane exceedence alerts, roadway departure warnings, drowsy driver alerts, forward collision warnings, lane change support, parking support, side object (blind spot) detection and any other suitable assistance system. Advanced Traveler Information Systems may include, but are not limited to, route guidance, location based commercial services, real-time server based traffic information, automated toll payment and the like.

Component locations may include the locations of, for example, a spare tire, a jack, windshield wipers, a headlight switch, and the like, as well as an operational description thereof. Luxury item features may include location and operational descriptions of radio, CD changer, power windows, power locks, embodied or docked wireless devices, satellite radio and the like. The features may be embodied in single or multi-lingual textual descriptions of the features and their operation, as well as a verbal description that may be played as audio to the user at the request of the user or upon actuation of a component within the vehicle in which the system is disposed.

Each of the databases 14, 16 is coupled to a system comparison module 18. The system comparison module processes the information in the databases 14, 16 and determines the differences between the features of the first, or current vehicle, and the features of the second, or prior vehicle. The differences between the features of the vehicles are written to a comparison results database 20, e.g. a third database. Where the operational aspects or features of the vehicles are the same or similar, there is no need for the user to be informed of such features because the user is already aware of these features. However, when features differ, it is desirable to inform the user of such differences. The differences written into the database 20 may include audio or textual information that, as described in detail below, may be requested by the user or may be automatically provided to the user.

A user recognition block 30 identifies the user of the current vehicle based on an indication received from the interface 12. For example, different users may have different keys, key fobs, smart cards or the like having associated codes that link the user to the code. Alternatively, the user may flip a switch to a particular position to indicate the user's identity. As a further alternative, biometric information such as, for example, height, weight, fingerprints, retinal scans and the like may be used to recognize users.

Having recognized the user via the block 30, the system 10 may employ a user preferences block 32 to store preferences of the recognized user. Changes to the user preferences block 32 may be affected via the interface 12, which may receive user preferences via wireless communication, the Internet, voice information or via any other suitable manner.

The user recognition block 30, the user preferences block 32 and the database 20 may each be coupled to an information extractor 34. The information extractor 34 may also exchange information with the interface 12. In general, during operation, system activation information flows to the information extractor 34, which accesses the blocks 20, 30 and 32 to selectively provide relevant information to the user via the interface 12. The relevant information may be audio, video or any other suitable information that may be perceived by the user. The relevant information may be representative of the difference between features that are known and new.

System activation information may be at least two different types of information such as, for example, specific requests for information or outputs received from a feature that is new to the user or operates differently from features previously used by the user. For example, a user may request specific information by saying, "Where is my spare tire?" The audio generated by the user's query is processed by a voice recognition system (not shown) into information that is coupled to the interface 12. The information is coupled from the interface 12 to the information extractor 34, which accesses the database 20. Because the spare tire must be in a different location than previously familiar to the user (or the user would not be asking the whereabouts of the spare), the database 20 includes an audio response to the query. The audio response is coupled from the database 20 through the information extractor 34 and the interface 12 and is then manifest to the user as relevant information. For example, the audio response may be "The spare tire is below the panel in the bottom of the trunk." Upon hearing the response from the system 10, the user is now aware of the location of the spare tire. Optionally, the user may be able to instruct the system 10 not to provide the spare tire information again. Such an instruction would be a user preference. Because the system 10 knows the identity of the user, it can connect the user preference with the user and remember not to provide the user with this information in the future.

As a further example, a user may actuate the temperature control, which is new to the user based on the previous vehicle owned by the user. Upon actuating the control, a signal is coupled to the information extractor 34 from the temperature control unit (not shown). The information extractor 34 queries the database 20 and finds that the temperature control is different between the current system and the prior system. Accordingly, an audio or textual description may be provided to the user, via the information extractor 34 and the interface 12, as relevant information. This information is provided to the user without being specifically requested by the user. The user may be able to request not to receive the temperature control information again.

While the foregoing examples pertain to the provision of audio information to the user, it is contemplated that information may be provided via any other technique. For example, the information may be provided via text on a display screen or via any other suitable manner. Additionally, it will be readily appreciated by those having ordinary skill in the relevant art that the information (both textual and audio) presented to a user may be available in multiple languages or dialects.

The new human/machine interface (e.g., voice recognition and voice command systems, heads-up displays, etc.) will be as intuitive as their designers can make them, but may still require instructions so that users understand their full functionality. From a user's perspective, the least distracting function or interface is the one for which the user has the clearest and most complete mental model.

As eluded to previously, although features may differ between the current system and the prior system, such as, for example, the operation of the temperature controls, it may not be necessary to provide relevant information to the same user each time he or she accesses the temperature controls. Accordingly, the information extractor 34 has access to the user recognition and user preference blocks 30, 32. When the information extractor 34 receives a system activated request for information, the information extractor 34 may determine if this relevant information has been previously provided to the user by examining the user preferences block 32 and, if the information has been previously provided, may opt to suppress the relevant information. Additionally, if the user has previously indicated that he or she does not desire to receive relevant information from the system 10, this fact may be reflected in the user preferences 32 and, therefore, the information extractor 34 will not provide relevant information in response to system activated information.

While the foregoing description describes blocks 12-34 as being implemented on the vehicle, this is not necessarily the case. For example, the databases 14, 16 and the system comparator module 18 could be separate from the vehicle and the system 10. The comparison results could be generated remotely from the system 10 and simply downloaded to the database 20 via the interface. Accordingly, the databases 14, 16 and the module 18 could, conceivably, be portions of hardware and/or software resident at a website, a vehicle dealer or some other location.

Figure 2:
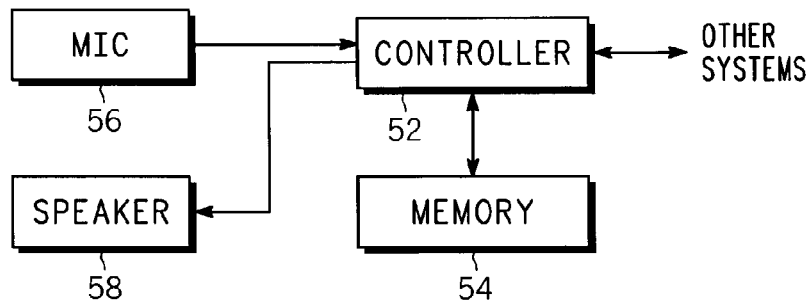
FIG. 2 is an exemplary block diagram illustrating hardware on which the information system of FIG. 1 may be implemented.

Turning now to FIG. 2, an information system, such as a vehicle information system 50 may include a controller 52, a memory 54, a microphone 56 and a speaker 58. The controller 52 may be coupled to other systems such as the systems mentioned in conjunction with FIG. 1.

In practice the controller 52 is embodied in any suitable microprocessor, microcontroller or digital signal controller. The controller 52 may include analog to digital (A/D) and digital to analog (D/A) converters for interfacing with analog devices such as the microphone 56 and the speaker 58. The memory 54 may be embodied in any suitable memory that may be large enough to accommodate the comparison results database 20, the current system database 14, the prior system database 16 or any other block of FIG. 1, as well as various instruction sets used to receive information from and to provide information to the user.

Figure 3:
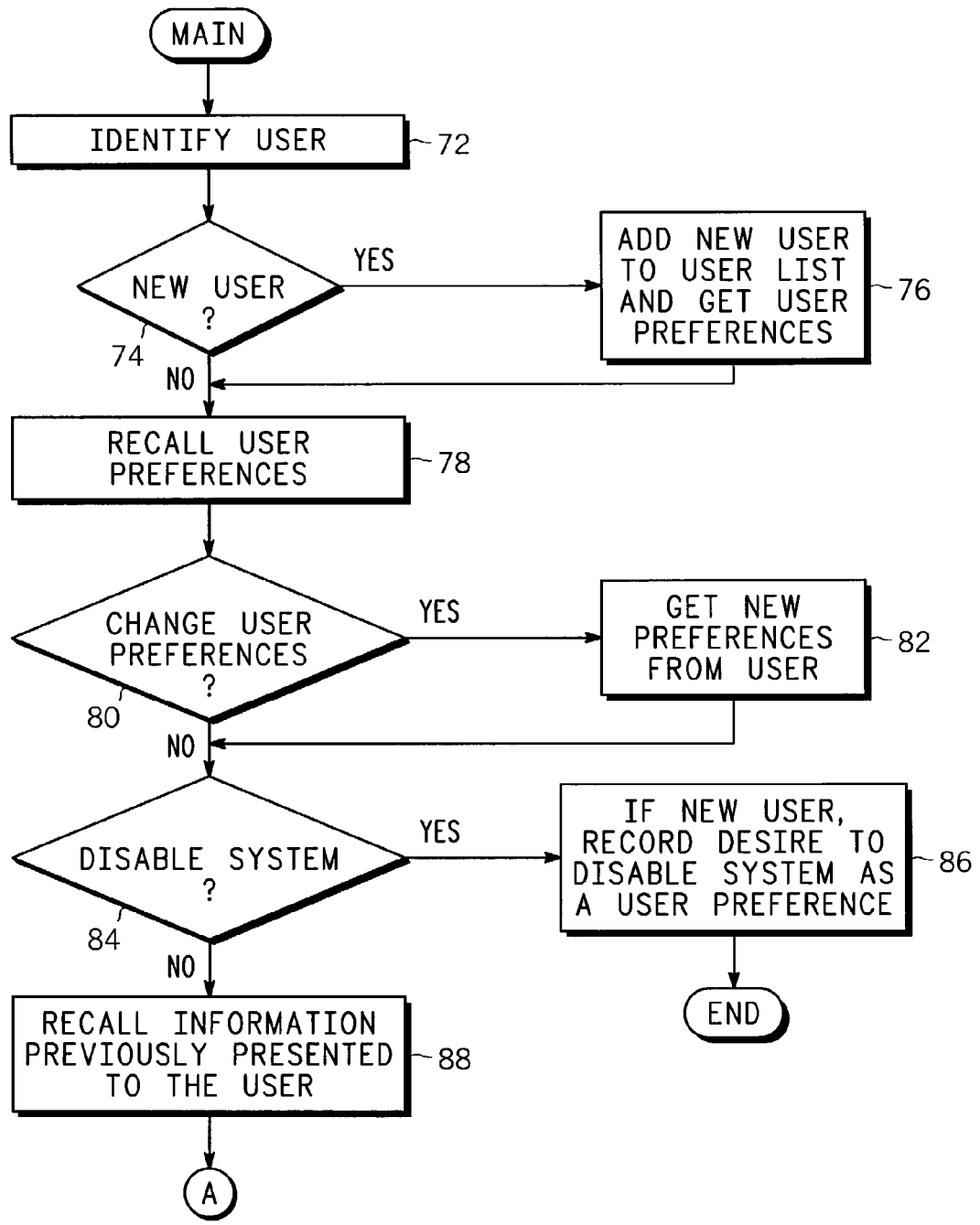
FIGS. 3 and 4 collectively form an exemplary flow diagram of a main routine that may be executed on the controller of FIG. 2 to implement an information system.
Figure 4:
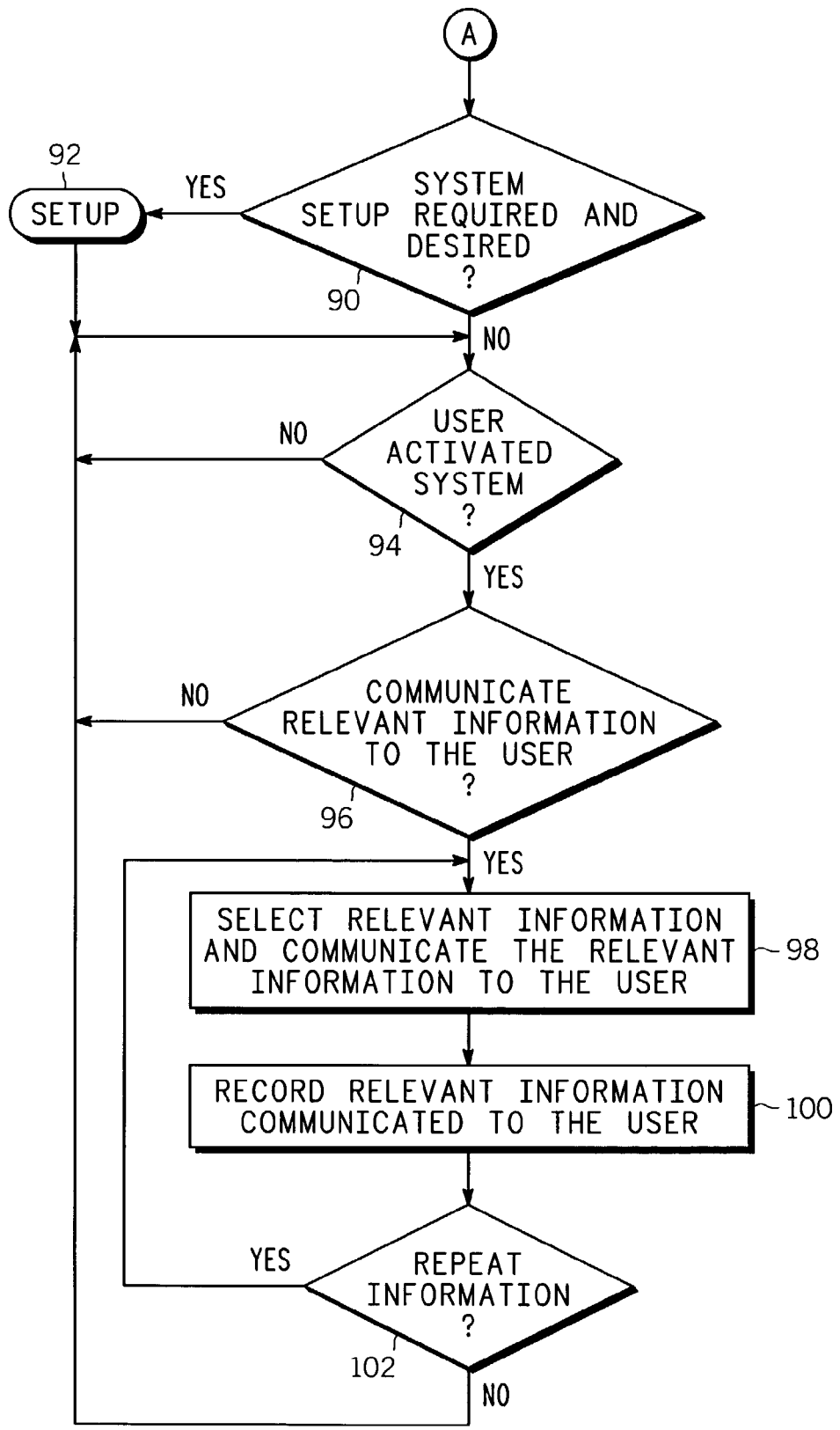
Figure 5:
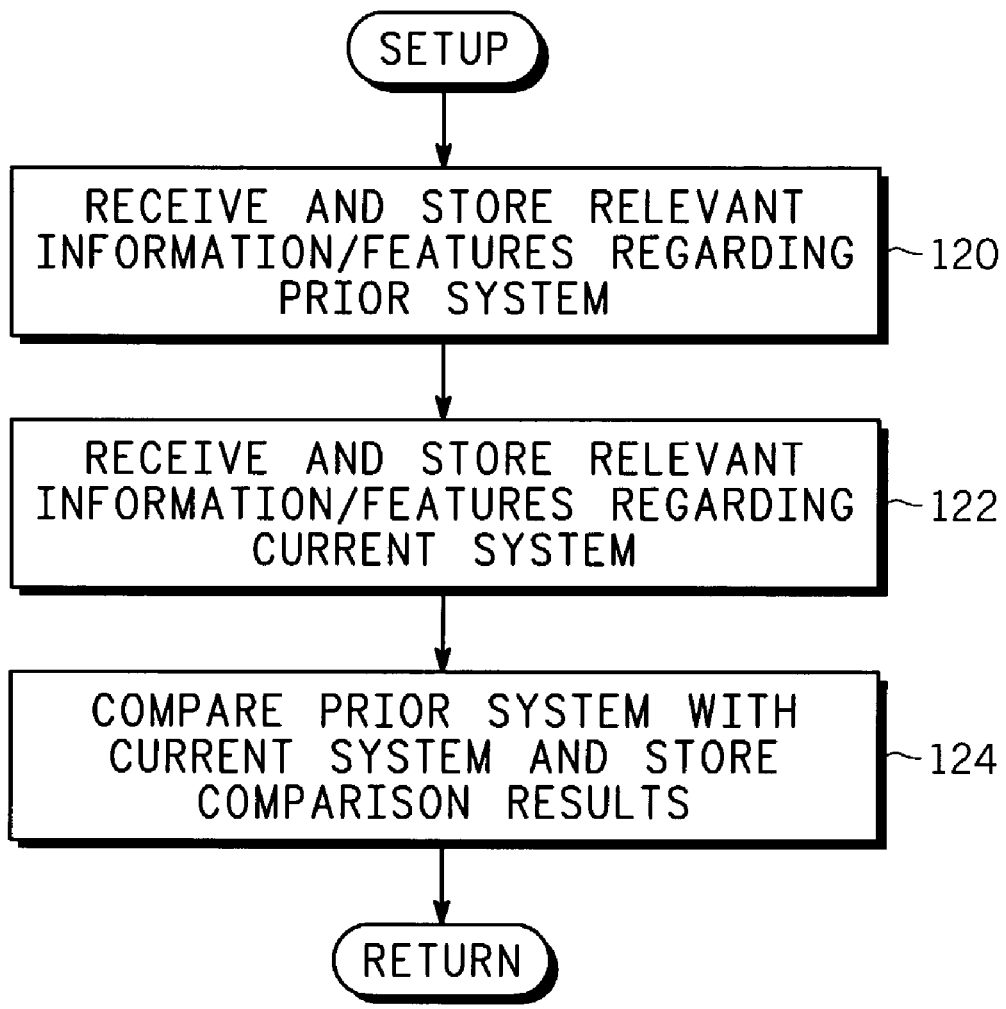
FIG. 5 is an exemplary flow diagram illustrating the details of the setup routine of FIGS. 3 and 4.

Flow diagram representations of the instructions that may be stored in memory 54 and executed by the controller 52 are provided in connection with FIGS. 3-5. While the blocks of FIGS. 3-5 are shown in a particular order, the order of the blocks is not necessarily essential. Additionally, while FIGS. 3-5 are designated as main and setup routines, respectively, it should be noted that these routines could be combined into a single, larger routine to form a sub-portion thereof. Alternatively, blocks of FIGS. 3-5 could be grouped together to form other subroutines. Accordingly, FIGS. 3-5 are merely illustrative of one arrangement.

A main routine 70, which may start every time the current vehicle is started or at any other suitable interval, begins execution at block 72 at which the user is identified. As noted previously, the user may be identified by a code from a key, a key fob, a smart card, by the state of a switch or by any relevant biometric information such as voice, fingerprints and the like obtained from the user. If the user is a new user, block 74 passes control to block 76, which adds the new user to a list of users and obtains the new users preferences.

If block 74 determines that the user is not new or after block 76 completes execution, control passes to block 78, which recalls the preferences of the user. User preferences may include not wanting to utilize the information system 50, which will be addressed below at block 84. Alternatively, the user preferences may include a list of messages previously provided to the user, so that such messages need not be duplicated. Accordingly, the user preferences may affect the information that is provided to the user.

Block 80 allows the user to change his or her preferences. If the user desires to change the user preferences, control passes from block 80 to block 82 where the system 50 gets new preferences from the user. The preferences may be input to the system 50 via the microphone 56 or by any of the other systems with which the controller 52 has communication.

If the user does not desire to change preferences or if the preferences have been changed at block 82, control passes to block 84, which determines if the user desires to disable the information system (i.e., the user does not desire to receive information from the system 50.) If the user desires to disable the system control passes from block 84 to block 86, which, if the user is a new user records the desire to disable the system as a user preference and ends execution of the main routine 70. If, however, the user is not a new user and the user preferences reflect the desire to disable the system 50, the block 86 does not make changes to the user preferences and merely ends execution of the main routine 70.

Alternatively, if block 84 determines that there is no desire to disable the system 50 for the user identified in block 72, control passes to block 88, which recalls information previously presented to the user. This information may be resident in, for example, the user preferences. After block 88 has completed execution, control passes to block 90, which determines if system setup is required and desired. System setup, which is described in detail below in conjunction with FIG. 5, may be run by the user or by another party such as, for example, a vehicle dealer. The system setup must generally be carried out before operation of the system 50. If system setup is required and desired, control passes to a setup routine 92.

After the setup routine 92 is complete or if setup is not desired and required, control passes to block 94, which determines if the user has activated the system. The user may activate the system by, for example, making a verbal request such as, "Where is my spare tire?" or by actuating vehicle features such as a temperature control. If block 94 determines that the user has not activated the system, control remains at block 94. However, if block 94 determines that the user has activated the system, control passes from block 94 to block 96.

Block 96 determines if relevant information should be communicated to the user. Block 96 may carry out this functionality out by checking user preferences to determine if such information has already been sent. If block 96 determines that information is not to be communicated to the user, control passes back to block 94. Alternatively, control passes to block 98.

Block 98 selects relevant information from the database 20, which may be stored in the memory 54, and communicates the relevant information to the user. As noted previously, the relevant information may be communicated to the user as audio via the speaker 58 or by any other system to which the controller 52 is coupled.

After relevant information is communicated to the user, control passes from block 98 to block 100, which records the relevant. information that was communicated to the user in, for example, the user preferences. The list of information previously communicated to the user may be used to ensure that a user does not receive redundant communication that is undesired. For example, once the user is informed about the temperature control system of the current vehicle, he or she may not want to receive that same communication again.

Block 102 gives the user the opportunity to have the system 50 repeat the information that was previously provided. If the user desires to have the message repeated, control passes back to block 98. Alternatively, if the user does not desire to have the message repeated by the system 50, control passes back to block 4, which awaits user activation of the system.

Details of the setup routine 92 are shown in FIG. 5. The routine 92 begins at block 120, which receives and stores relevant information regarding a prior, or previously known, system. For example, such information may include vehicle information pertinent to a vehicle with which the user is previously familiar.

After block 120 completes execution, control passes to block 122, which receives and stores relevant information regarding a current system. For example, the current system may include vehicle information pertinent to the new vehicle that the user has purchased.

Block 124 compares the prior and current system information looking for differences therebetween. Differences are stored in a database that the system 10 may access to provide information to the user.

Blocks 120 and 122 may be carried out by reading information from a wireless network, an Internet connection, an optical or magnetic disk, a user input or any other suitable source of vehicle information. As noted previously, the setup routine 92 may be carried out by the system 10 or may be carried out by another system and the resulting comparison information may be provided to the system 10 for use thereby.

Again, while the foregoing description has been provided with regard to vehicle information, this is merely exemplary of one type of system that may benefit from the disclosed system.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A method of providing to a user information associated with differences between features of a first vehicle and features of a second vehicle, the method comprising:
   electronically reading from a current system database information associated with the features of the first vehicle;
   electronically reading from a prior system database information associated with the features of the second vehicle;
   electronically comparing the current system database and the prior system database;
   electronically storing in a comparison results database disposed within the first vehicle information associated with the differences between the features of the first vehicle and the features of the second vehicle;
   electronically detecting a user action; and
   communicating to the user at least one difference between the features of the first vehicle and the features of the second vehicle.

2. The method of claim 1, wherein reading from the current system database and reading from the prior system database comprise accessing the current system database and the prior system database over a network.

3. The method of claim 1, wherein the features of the first vehicle and the features of the second vehicle comprise vehicle operational features.

4. The method of claim 1, wherein the features of the first vehicle and the features of the second vehicle comprise component locations.

5. The method of claim 1, wherein the features of the first vehicle and the features of the second vehicle comprise luxury item features.

6. The method of claim 1, wherein the user action comprises a request for information.

7. The method of claim 6, wherein the request for information comprises a verbal request for information.

8. The method of claim 1, wherein the user action comprises actuation of a component within the first vehicle.

9. A vehicle information system adapted to provide to a user information associated with differences between features of a first vehicle and features of a second vehicle, the vehicle information system comprising:

a controller disposed in the first vehicle;

a memory disposed in the first vehicle and coupled to the controller;

a first instruction set stored in the memory and for execution by the controller, wherein the execution of the first instruction set by the controller causes the controller to read from a current system database information associated with the features of the first vehicle;

a second instruction set stored in the memory and for execution by the controller, wherein the execution of the second instruction set by the controller causes the controller to read from a prior system database information associated with the features of the second vehicle;

a third instruction set stored in the memory and for execution by the controller, wherein the execution of the third instruction set by the controller causes the controller to compare the current system database and the prior system database;

a fourth instruction set stored in the memory and for execution by the controller, wherein the execution of the fourth instruction set by the controller causes the controller to store in a comparison results database disposed within the first vehicle information associated with the differences between the features of the first vehicle and the features of the second vehicle;

a fifth instruction set stored in the memory and for execution by the controller, wherein the execution of the fifth instruction set by the controller causes the controller to detect a user action; and a sixth instruction set stored in the memory and for execution by the controller, wherein the execution of the sixth instruction set by the controller causes the controller to communicate to the user at least one difference between the features of the first vehicle and the features of the second vehicle.

10. The vehicle information system of claim 9, wherein the current system database and the prior system database are disposed within the first vehicle.

11. The vehicle information system of claim 9, wherein the comparison results database is stored in the memory.

12. The vehicle information system of claim 9, wherein the current system database and the prior system database is coupled to the controller over an Internet connection.

13. The vehicle information system of claim 9, wherein the features of the first vehicle and the second vehicle comprise vehicle operational features.

14. The vehicle information system of claim 9, wherein the features of the first vehicle and the second vehicle comprise component locations.

15. The vehicle information system of claim 9, wherein the features of the first vehicle and the second vehicle comprise luxury item features.

16. The vehicle information system of claim 9, wherein the user action comprises a request for information.

17. The vehicle information system of claim 16, wherein the request for information comprises a verbal request for information.

18. The vehicle information system of claim 9, wherein the user action comprises actuation of a component within the first vehicle.

* * * * *